No. 624,496. Patented May 9, 1899.
S. V. HUBER.
SHEAR MECHANISM.
(Application filed May 6, 1898.)

(No Model.) 7 Sheets—Sheet 1.

FIG. 1.

WITNESSES:

INVENTOR,
Sigmund V. Huber
by Dennis S. Wolcott
Att'y.

THE NORRIS PETERS CO., PHOTO-LITHO., WASHINGTON, D. C.

No. 624,496. Patented May 9, 1899.
S. V. HUBER.
SHEAR MECHANISM.
(Application filed May 6, 1898.)
(No Model.) 7 Sheets—Sheet 2.

FIG. 2.

WITNESSES:
Chas. F. Miller.
Wm H Erskine

INVENTOR,
Sigmund V. Huber
by Darwin S. Wolcott
Att'y.

No. 624,496. Patented May 9, 1899.
S. V. HUBER.
SHEAR MECHANISM.
(Application filed May 6, 1898.)

(No Model.) 7 Sheets—Sheet 3.

WITNESSES: INVENTOR,
Chas. F. Miller. Sigmund V. Huber
Wm H. Erskine by Darwin S. Wolcott
Att'y.

THE NORRIS PETERS CO., PHOTO-LITHO., WASHINGTON, D. C.

No. 624,496. Patented May 9, 1899.
S. V. HUBER.
SHEAR MECHANISM.
(Application filed May 6, 1898.)

(No Model.) 7 Sheets—Sheet 4.

WITNESSES:
Chas. P. Miller
Wm H Erskine

INVENTOR,
Sigmund V. Huber
by Samuel S. Wolcott
Att'y.

THE NORRIS PETERS CO., PHOTO-LITHO., WASHINGTON, D. C.

No. 624,496. Patented May 9, 1899.
S. V. HUBER.
SHEAR MECHANISM.
(Application filed May 6, 1898.)
(No Model.) 7 Sheets—Sheet 5.

FIG. 9.

WITNESSES: INVENTOR,
Chas. F. Miller. Sigmund V. Huber
Wm. H. Erskine by Dannis S. Wolcott
Att'y.

No. 624,496. Patented May 9, 1899.
S. V. HUBER.
SHEAR MECHANISM.
(Application filed May 6, 1898.)
(No Model.) 7 Sheets—Sheet 6.

WITNESSES:
Chas. P. Miller
Wm H Erskine

INVENTOR,
Sigmund V. Huber
by Danvers S. Wolcott
Att'y.

No. 624,496.

S. V. HUBER.
SHEAR MECHANISM.
(Application filed May 6, 1898.)

(No Model.)

Patented May 9, 1899.

WITNESSES:
Chas. F. Miller.
W. H. Erskine

INVENTOR,
Sigmund V. Huber
by Darwin S. Wolcott
Att'y.

UNITED STATES PATENT OFFICE.

SIGMUND V. HUBER, OF YOUNGSTOWN, OHIO.

SHEAR MECHANISM.

SPECIFICATION forming part of Letters Patent No. 624,496, dated May 9, 1899.

Application filed May 6, 1898. Serial No. 679,906. (No model.)

*To all whom it may concern:*

Be it known that I, SIGMUND V. HUBER, a citizen of the United States, residing at Youngstown, in the county of Mahoning and State of Ohio, have invented or discovered certain new and useful Improvements in Shear Mechanism, of which improvements the following is a specification.

The invention described herein relates to certain improvements in shear mechanism, especially applicable to shears employed for the simultaneous cutting of a series of two or more bars, &c.

The invention has for its object a construction of mechanism whereby an equal and simultaneous feed of all the bars passing through the shears at one time is insured.

It is a further object of the invention to provide a yielding support for the bars in the rear of and adjacent to the shears.

In general terms the invention consists in the construction and combination substantially as hereinafter more fully described and claimed.

In the accompanying drawings, forming a part of this specification, Figs. 5 and 6 are sectional detail views, the planes of section being indicated by the lines V V, Fig. 6. Fig. 6 is a similar view, the plane of section being indicated by the line VI VI, Fig. 4. Figs. 12 and 13 are plan and rear elevations, respectively, of a modified form of the bar-supporting table, and Fig. 14 is a transverse section of the same, the plane of section being indicated by the line XIV XIV, Fig. 13.

As regards the construction of the housings 1, the cross-head, the means for connecting the cross-head to the power-shaft 3, the arrangement of gearing or other devices for transmitting motion to the power-shaft from the driving-shaft 4, and the manner of connecting the shaft 4 to the motor any suitable or desirable construction and arrangement may be employed.

Figure 4:
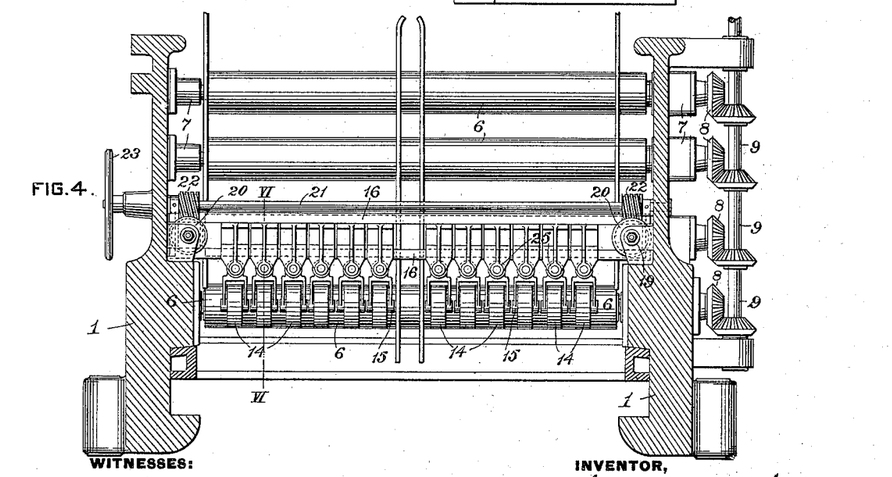
Fig. 4 is a sectional plan view, the plane of section being indicated by the line IV IV, Fig. 3.
Figures 5, 6:
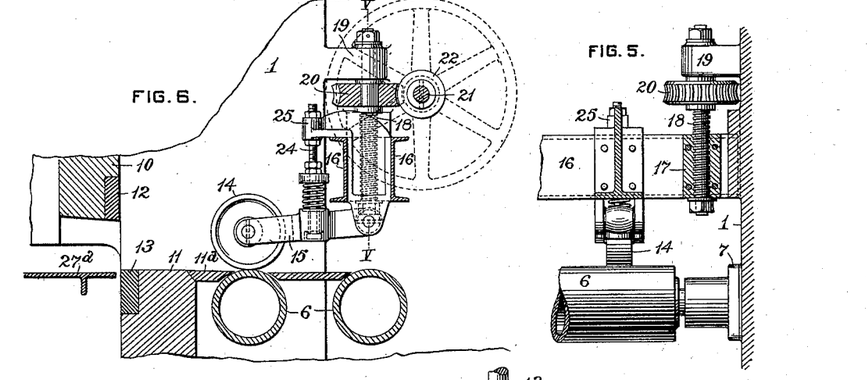

The bars to be sheared are fed from a feed-table onto the rollers 6, which are mounted in suitable bearings 7, formed on or secured to the housings 1, as clearly shown in Fig. 4. The journals at one end of the rollers 6 extend through one of the housings and have keyed thereto beveled pinions 8, intermeshing with corresponding pinions on the shaft 9, which is connected to or operated in unison with the driving-shaft of the feed-table, so that said rollers will have the same speed as those of the feed-table. As shown in Figs. 4 and 6, these rollers extend up as near as possible to the shear-blocks 10 and 11, carrying the blades 12 and 13. The space between the end roller and the shear-block 11 is bridged by an apron 11ª, as shown in Fig. 6, to insure the entrance of the bars in case their forward ends are bent down between the shear-blades. It is the usual practice to feed a number of bars simultaneously to the shears, and to insure the onward movements of the bars it is customary to arrange a pressing-roller above one of rollers 6, against which the pressing-roller is yieldingly held by springs or other suitable means. As the bars vary slightly in thickness, it is evident that a continuous pressing-roller will not bear on all the bars, so that an irregular feed of the bars results. In order to insure an equal and simultaneous feed of the bars, a series of independent rollers 14 are loosely mounted between the forked ends of a like series of levers 15, which are mounted on fulcra so arranged that the rollers 14 will bear upon one, preferably the last, of the series of rollers 6, as shown in Figs. 4, 5, and 6. The opposite ends of the levers are pivotally connected to a beam 16, having its ends arranged in suitable guides formed on the inner faces of the housings 1. This beam is provided adjacent to its ends with blocks 17, internally threaded for the reception of the screws 18, which have their uppers secured in lugs 19, formed on or secured to the housings. Worm-wheels 20 are keyed to the screws 18 and are rotated to raise or lower the beam by a shaft 21, mounted in bearings formed in the housings and provided with worms 22, engaging the worm-wheels 20. The shaft is rotated by means of a hand-wheel 23 on one end of the shaft 21, which projects through the housings. The resilient pressure of the rollers 14 on the bars may be effected in a variety of ways—as, for example, by employing yielding fulcra, as shown in Fig. 6. The levers are supported by the heads of pins 24, suspended from lugs 25 on the beam 16 and passing loosely through the levers. Springs 26 are interposed between the levers and shoulders on the pin. It will be observed that for purposes of adjustment the pins and springs serve as fulcra for the levers; but when the rollers are lifted by the passage of the bars under them their points of connection with the beam 16 become the fulcra of the levers.

Figure 7:
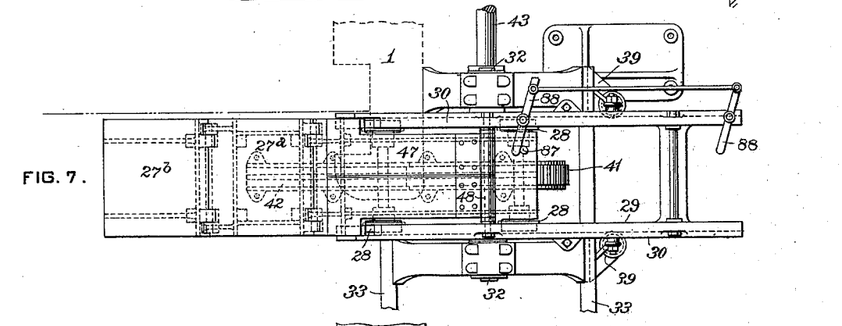
Figs. 7 and 8 are plan and side elevations of the bar-support.
Figure 8:
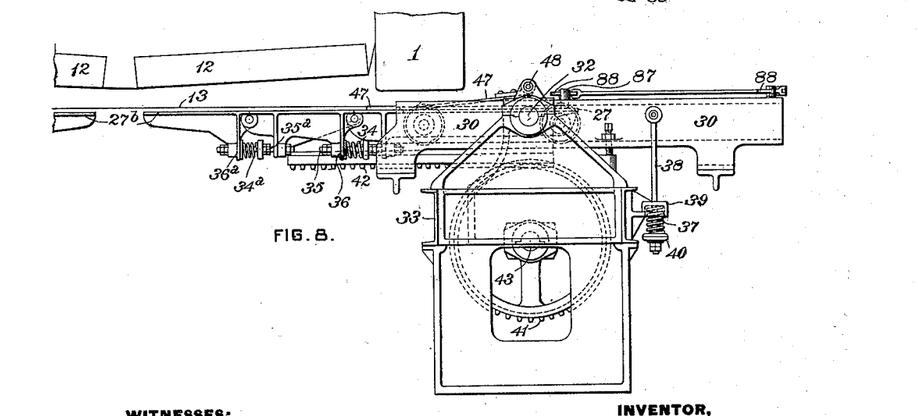

It will be readily understood that as long as any portion of the bars is held by the rollers 6 and 14 the former will prevent any material tipping or downward flexing of the front ends of the bars; but as soon as the rear ends of the bars have passed from between the feed-rollers the portions of the bars beyond the shears should be held from dropping down. In order to support the bars adjacent to the shears, one or two tables are so mounted in the rear of the shear mechanism as to be capable of movement back and forth transverse of the lines of movement of the bars as they are being fed through the shear mechanism, as shown in Figs. 7 and 8. These tables consist of a series of platforms 27 27$^a$ 27$^b$, &c., the main platform 27 being supported on wheels 28, arranged to move back and forth between ledges 29, formed on or secured to the inner faces of the sides 30 of a frame which is provided with trunnions 32, mounted in suitable bearings formed on the stand 33. The platform 27$^a$ is pivotally mounted on the inner end of the platform 27 in such manner as to form, when held in normal position, a continuation of the main platform. The platform 27$^b$ is similarly mounted on the platform 27$^a$. These platforms 27$^a$ and 27$^b$ are held in normal or horizontal position by means of springs 34 34$^a$, surrounding pins 35 35$^a$, which are secured at one end to one of the platforms, while the opposite ends pass loosely through lugs 36 36$^a$, formed on or secured to the adjacent platforms. The springs 34 and 34$^a$ bear at one end against shoulders formed on the pins 35 35$^a$ and at their opposite ends against the lugs 36 36$^a$. The frame carrying the platform 27 is held in normal or horizontal position by springs 37, surrounding the rods 38, which have one end connected to said frame and extend down through lugs 39 on the stand 33. The springs 37 bear at their ends against the lugs 39 and shoulders 40 on the rods 38.

The platforms are shifted to and from operative relation to the shears by means of gear-wheels 41, intermeshing with rack-bars 42 on the under sides of the platforms 27. These gear-wheels are secured on shafts 43, which are rotated by fluid-pressure cylinders 44 44$^a$, which have their pistons connected to a bar 45, provided with teeth adapted to intermesh with pinions 46, one of which is keyed to one of the shafts 43, while the other is keyed to a short counter-shaft having a pinion intermeshing with the pinion on the shaft 43.

When a V-shaped movable blade is employed, so that the cutting proceeds from the middle outwardly, two supporting-tables are employed, said tables being duplicates of each other. Where the movable shear-blade is made straight, so that the cut proceeds from one side to the other, only one table need be employed, such table having a sufficient number of platforms to extend entirely across the shear.

As shown in Fig. 8, the upper surfaces of the platforms are approximately on a level with the lower blade of the shears, thereby forming a support practically continuous with the edge of the lower blade for supporting the bars as they are being fed to cutting position. As the movable blade descends and severs the portion of the bar projecting beyond the lower blade such projecting portion will be also forced down a distance equal to the amount the movable blade will overlap the lower blade. This downward movement of the bars will press down the platforms on which they rest, so that the platform will afford a support for the projecting portions of the bar before and during the shearing operation. After each upstroke of the movable blade the tables are moved back, and during such movement any sheared portions of the bars which may be on the platforms will be forced off by the stripping-plate 47, which is so secured to a bar 47$^a$, attached at its ends to the stand 33, as to yieldingly bear upon the platforms, as shown in Figs. 7 and 8.

Figures 12, 13, 14:
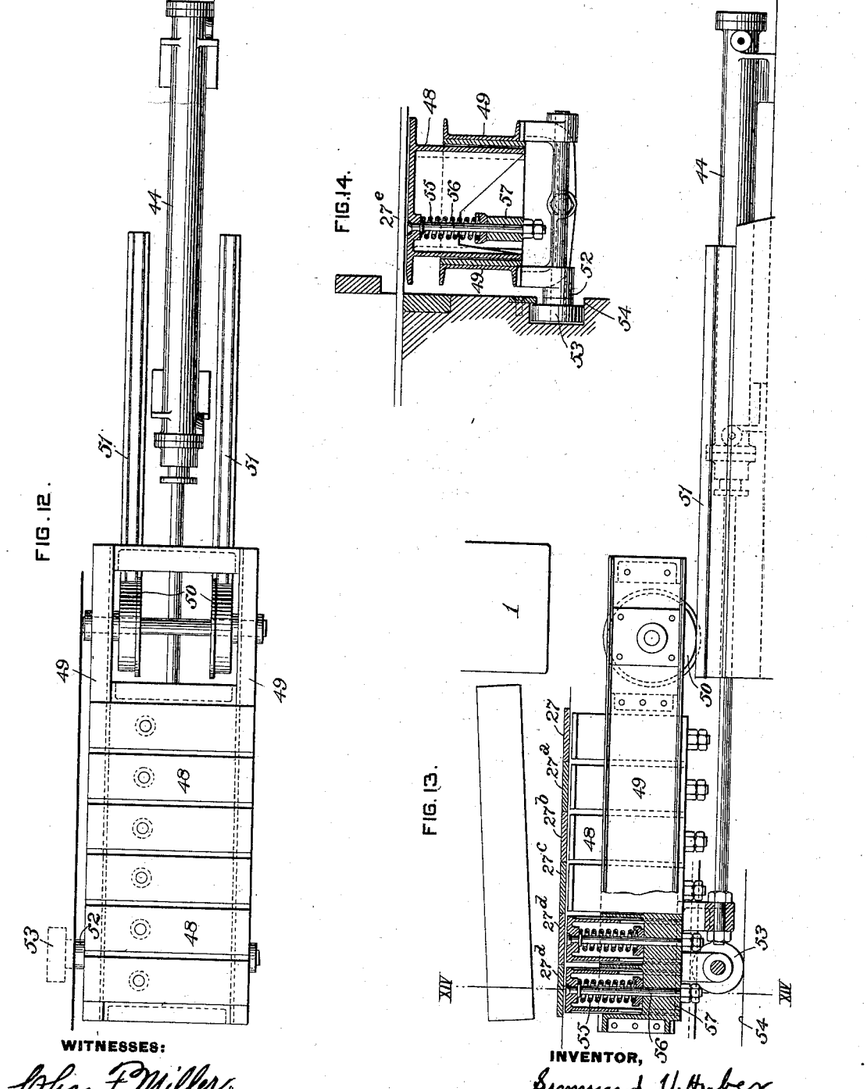

In lieu of the construction shown in Figs. 7 and 8 the platforms 27 27$^a$, &c., may be formed on the upper ends of guide-stems 48, constructed to slide vertically between guiding-walls formed in the frame 49, as shown in Figs. 12, 13, and 14. The frame 49 is provided at its rear end with wheels 50, mounted on suitably-supported rails 51, while its front end is provided with a laterally-projecting bracket 52, on which is mounted a roller 53, adapted to move along on a ledge 54, formed in or secured to the housings of the shears. Each platform is yieldingly supported in raised or operative position by a spring 55, surrounding a bolt 56 and bearing at its ends against the under side of the platform, and a longitudinal brace 57 of the frame. The bolt 56 passes loosely through openings in the brace to permit of the yielding of the platforms, which are held from too great upward movement by nuts on the lower ends of the bolts.

In lieu of connecting the tables by rack-and-pinion connections to the operating-cylinder 44 the latter may have its piston connected directly to the tables, as shown in Figs. 12 and 13.

The movements of the bars through between the shear-blades is controlled by a gage or stop mechanism, (shown in Figs. 1, 3, 9, 10, and 11,) arranged in the rear of the shear mechanism, and consists of a frame 58, provided at its ends with guide eyes or loops 59, fitting loosely around the threaded bars 60. The inner ends of these bars are secured to the housings of the shears, and their outer ends are supported by standards 61. This frame is shifted by means of internally-threaded worm-wheels 62, mounted on the threaded bars and arranged between the guide loops or eyes 59 in the frame 58. The worm-wheels are rotated by worms 63, formed in the shaft 64, mounted in suitable bearings on the frame 58. A bevel-pinion 65 is keyed on the shaft 64 and intermeshes with a bevel-pinion so mounted on the shaft 66 as to be free to move along, but to rotate therewith. This shaft is rotated by the driving-shaft 4, the latter having a bevel-pinion 67 keyed thereon and intermeshing with a similar pinion on the shaft 68, which has a beveled pinion 69 keyed to its lower end. A sleeve 70 is mounted on the shaft so as to rotate therewith, but capable of being shifted in order to engage one or the other of the beveled pinions 71, which are loosely mounted on the shaft 69 in such manner as to be constantly in engagement with the beveled pinion 69.

Figure 9:
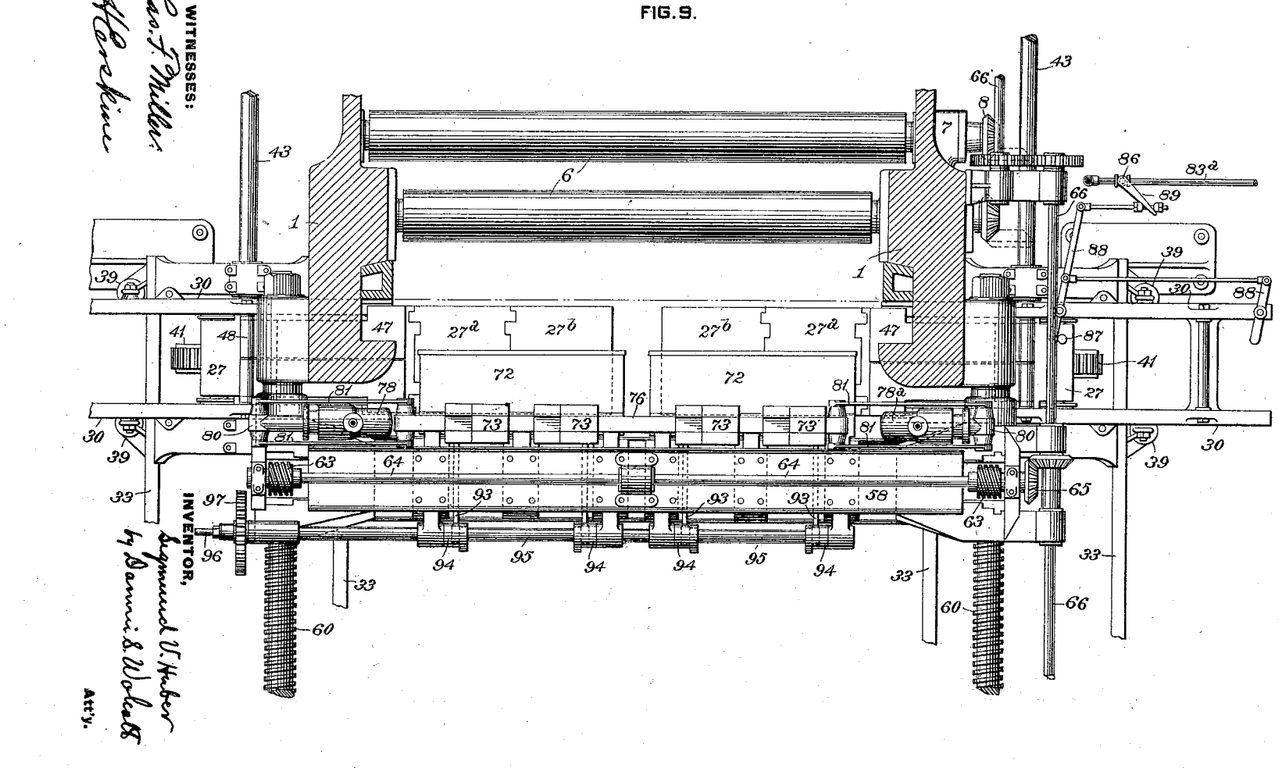
Fig. 9 is a top plan view of the gage mechanism.
Figures 10, 11:
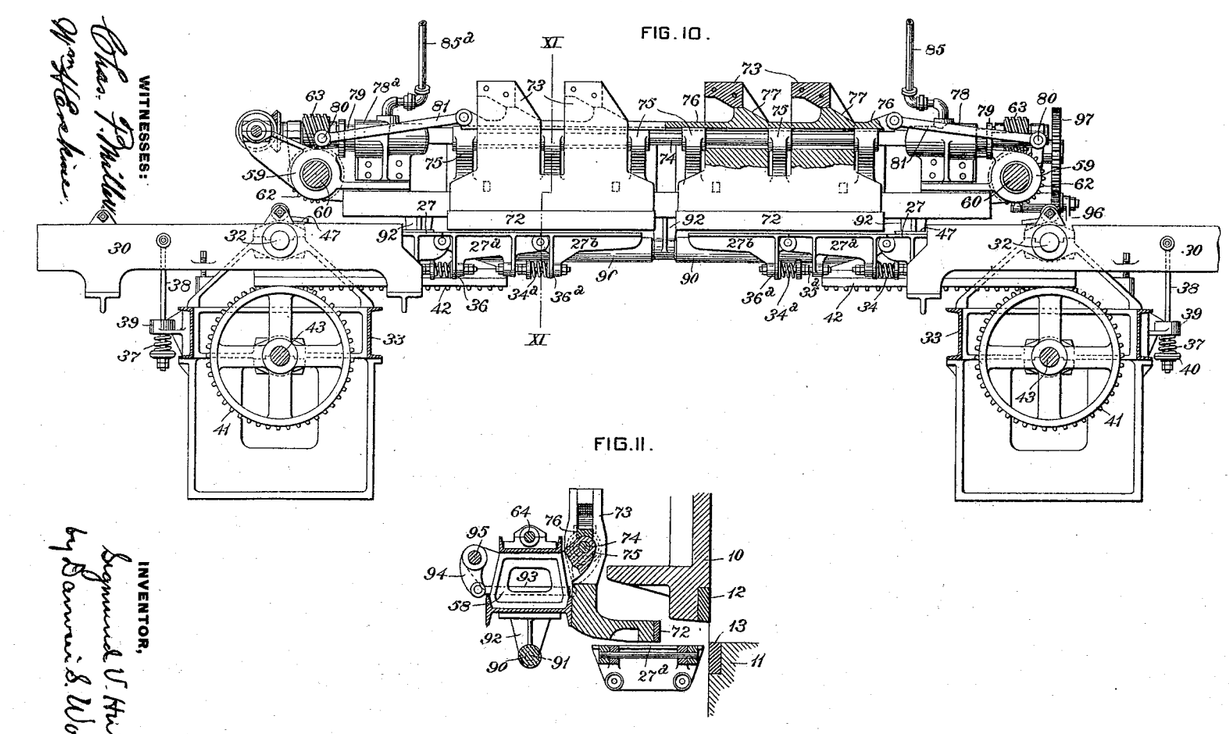
Fig. 10 is a view, partly in elevation and partly in section, of the gage mechanism.
Fig. 11 is a transverse section, the plane of section being indicated by the line XI XI, Fig. 10.

The gage-plate 72 is provided with lugs or ears 73, whereby the bar is adjustably suspended from the shaft 74, which is supported in lugs or ears 75, formed on the frame 58. The gage-plate is so hung that normally its front or operative edge will extend below a horizontal plane coincident with the operative edge of the lower shear-blade, so as to be in the line of movement of the ends of bars, which when cutting long lengths would droop down below the level of the edge of the lower shear-blade. When cutting lengths less than the width of the supporting-tables, the upper surfaces of which are approximately on a level with the edge of the lower-shear blade, provision is made for raising the gage-plate, so that the table can move in and out under the gage-plate. This vertical adjustment of the gage-plate can be effected in several ways, and therefore the invention, as regards the adjustability of the bar, is not limited to any specific form of mechanism for effecting such purpose. A convenient means for adjusting the gage-plate consists of a bar 76, arranged on the shaft 74 or on the ears 75 and provided with a series of cam projections 77. The ears or lugs 73 are slotted, and the cam projections 77 are so arranged as to move back and forth through such slots. The upper walls of these slots rest upon the inclined faces of the projections 77, so that by shifting the bar back and forth the gage-plate can be raised and lowered, as required.

Figure 1:
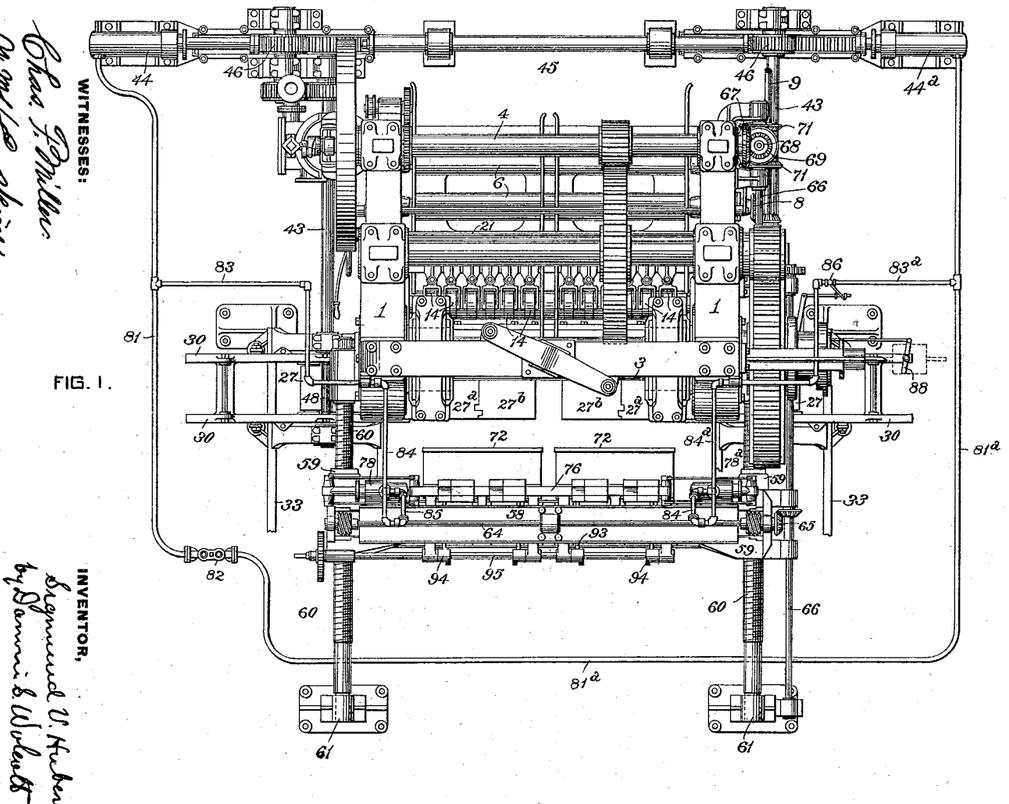
Figure 1 is a top plan view of a shear mechanism having my improvements applied thereto.
Figure 2:
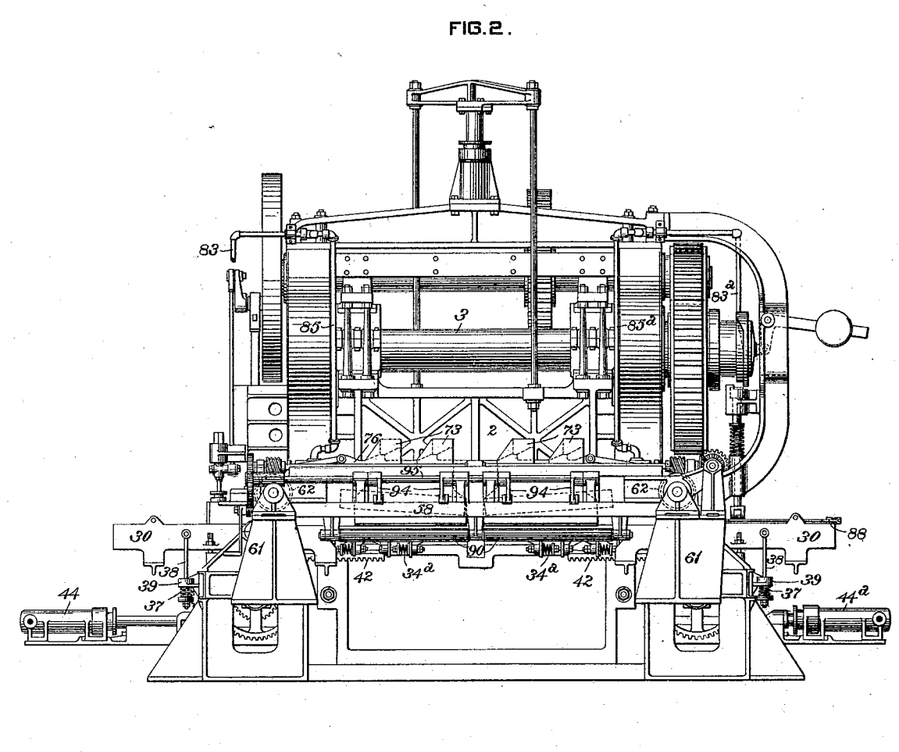
Fig. 2 is a rear elevation of the same.
Figure 3:
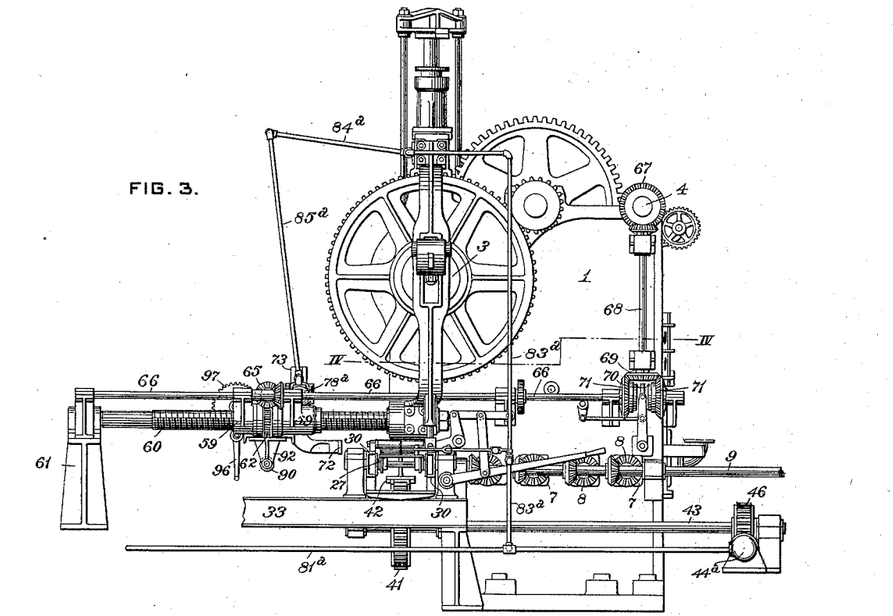
Fig. 3 is a side elevation.

The movements of the bar 76 are effected by means of fluid-pressure cylinders 78 and 78$^a$, provided with pistons or rams 79, having cross-heads 80. These cross-heads are connected by links 81 to cross-heads on the ends of the bar 76. By the admission of fluid to one or the other of these cylinders the gage-plate can be raised or lowered. As this vertical adjustment of the gage-plate is necessary only when the bar-supporting tables are moved into and out of operative position while cutting sections shorter than the width of the table, it is desirable that the tables and gage-plate should be shifted as nearly simultaneously as possible. To this end pipes 81 and 81$^a$, connecting the table-operating cylinders 44 44$^a$ to the valve mechanism 82, are provided with branch pipes 83 83$^a$, which extend to some suitable elevated support, as the housing of the shear mechanism, as shown in Figs. 1, 2, and 3. The upper ends of these sections are connected by flexible joints to horizontal sections 84 84$^a$, which have their outer ends connected by similar joints to vertical sections 85 85$^a$. The lower ends of the vertical sections are connected by flexible joints to the fluid-pressure cylinders 78 78$^a$. It will be readily understood that the gage-plate, if within the path of movement of the tables, must be raised before the tables are moved in and that the latter must be moved out before the gage-plate is lowered. As the flow of fluid to the cylinders 44 44$^a$ and 78 and 78$^a$ is controlled by one valve mechanism, the prior outward movement of the tables which is effected by the cylinder 44$^a$ is insured by means of a valve 86, arranged in the branch pipe 83$^a$, leading to the cylinder 78$^a$, employed for effecting the lowering of the gage-plate. As shown in Figs. 1 and 9, the valve 86 is controlled by a pin 87 on one of the tables, operating through levers 88 and 89 to open the valve when the tables have been moved out and to close the valve when the tables have been moved into operative position. In order to insure the lifting of the gage-plate before the tables have been shifted to operative position, the inlet-ports of the cylinders 44 and 78, which effect the inward movement of the tables and the lifting of the gage-plate, are so proportioned relative to the sizes of the cylinders as to insure the lifting of the gage-plate ahead of the movement of the tables. In other words, the inlet-port of cylinder 78 is made quite large and the inlet-port of the cylinder 44 is made comparatively small, so that the fluid-pressure will be effectively operative on the piston of cylinder 78 prior to effecting any material movement of the piston of cylinder 44.

In cutting long sections of bars an intermediate support therefor is sometimes desired. To this end rollers 90 are loosely mounted on a shaft 91, secured in lugs 92, depending from the frame 58. As the bars are fed through the shears they will pass over and be supported by the rollers 90. As the rollers 90 are arranged in the rear of the gage-plate, provision is made for swinging the latter on the shaft 74 out of the line of movement of the bars by pins 93, arranged in suitable guides in the frame 58 and bearing at their front ends against the gage-plate. The rear ends of these pins are connected to arms 94, keyed to the shaft 95, which is mounted in suitable bearings on the frame 58. This shaft is rotated to swing the gage-plate by a crank-handle 96, having its shaft mounted in suitable bearings in the frame 58 and provided with a pinion engaging a gear-wheel 97 on the shaft 95.

I claim herein as my invention—

1. The combination of a shear mechanism and a series of yielding platforms arranged adjacent to the shear mechanism whereby different portions of the material operated on are independently supported, substantially as set forth.

2. The combination of a shear mechanism, a series of yielding platforms arranged adjacent to the shear mechanism, and means for shifting the platforms to and from operative position in the rear of the shear mechanism, substantially as set forth.

3. A supporting-table having in combination a series of pivotally-mounted platforms and means for yieldingly holding the several platforms in or approximately in alinement with each other, substantially as set forth.

4. The combination of a shear mechanism, a series of yielding platforms arranged adjacent to the shear mechanism, means for shifting the platform to and from operative position in a direction parallel with the shear-blades and a stationary stripper, substantially as set forth.

5. The combination of a shear mechanism, two tables provided with yielding platforms, and means for simultaneously moving the tables to and from operative position, substantially as set forth.

6. A gage mechanism for shears having in combination a gage-plate, means for adjusting the gage-plate vertically and means for shifting the gage-plate out of the path of movement of articles to be shifted, substantially as set forth.

7. A gage mechanism for shears having in combination a pivotally-mounted gage-plate, a supporting-roller arranged in the rear of the gage-plate and means for shifting the gage-plate, substantially as set forth.

8. The combination of a shear mechanism, a table provided with yielding platforms arranged in the rear of the shear mechanism, a gage-plate, and means for shifting the table and adjusting the gage in proper sequence, substantially as set forth.

9. The combination of a supporting-table, means for shifting said table, a movable gage mechanism unsupported by the table and means controlled by the table for shifting the gage mechanism, substantially as set forth.

In testimony whereof I have hereunto set my hand.

SIGMUND V. HUBER.

Witnesses:
LEO GUTHMAN,
JOHN F. CANTWELL.